Nov. 21, 1967     J. WÜNNING     3,353,922
REDUCING GAS GENERATOR APPARATUS
Filed May 17, 1965     3 Sheets-Sheet 2

Inventor:
JOACHIM WÜNNING

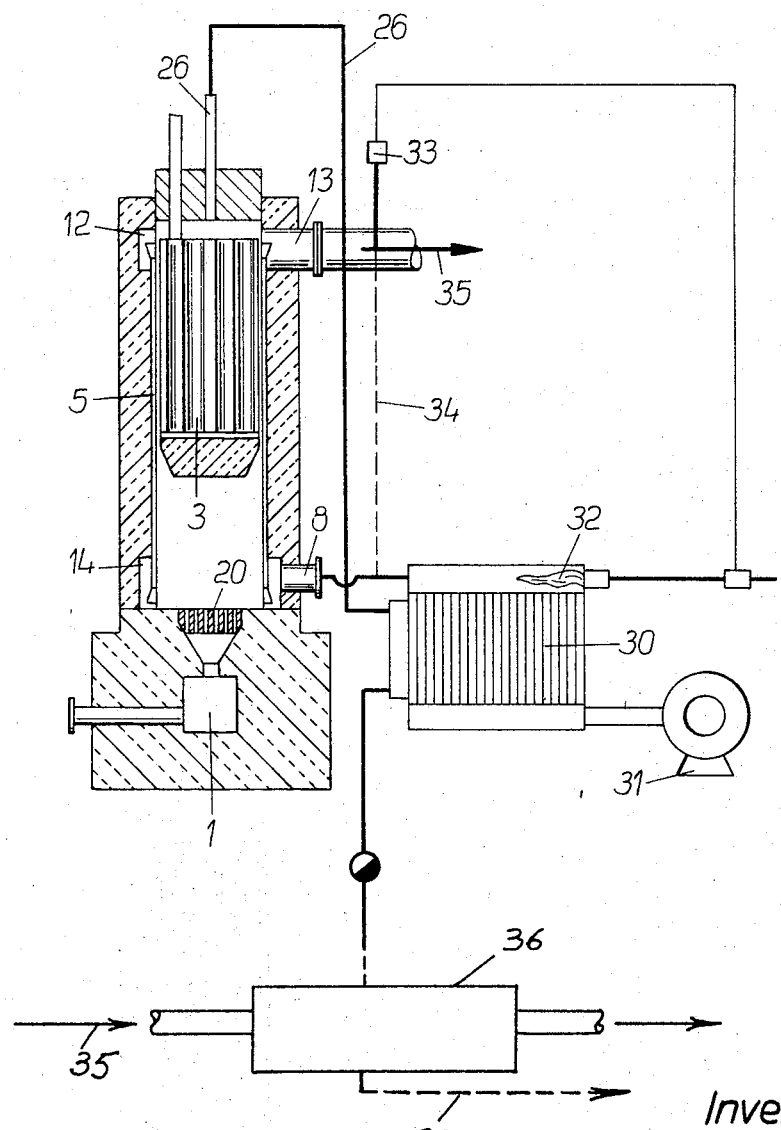

United States Patent Office 3,353,922
Patented Nov. 21, 1967

3,353,922
REDUCING GAS GENERATOR APPARATUS
Joachim Wünning, Leonberg, Wurttemberg, Germany, assignor to J. Aichelin, Korntal, near Stuttgart, Germany, a corporation of Germany
Filed May 17, 1965, Ser. No. 456,349
Claims priority, application Germany, May 22, 1964, A 46,112
13 Claims. (Cl. 23—281)

The present invention relates to reducing gas generator apparatus, and more particularly to such a gas generator which consists of a unitary assembly of combustion chamber, heat exchanger and a catalytic gas converter.

Reducing gas, particularly as utilized as a protective gas, is usually generated from a fuel containing carbon, for example coke or mineral oil, which is burned in an atmosphere having insufficient oxygen. Upon combustion, a mixture of gases is obtained, which essentially consists of hydrogen ($H_2$), water ($H_2O$), carbon monoxide (CO), carbon dioxide ($CO_2$) and nitrogen ($N_2$). The relative proportion of the components of this gas mixture depends upon the nature of the fuel used and the conditions of combustion.

The carbon monoxide component of the gas is usually not desired. Carbon monoxide is toxic and requires special safety precautions. Furthermore, at temperatures of about 500° C. it has a tendency to form soot which is inherently undesirable. Thus, the component which has reducing effect in the gas mixture should preferably be the hydrogen. Therefore, gas obtained from the combustion chamber is converted by means of catalysts so that the hydrogen component is increased and that of the carbon monoxide component decreased. This conversion is according to the relationship: $CO + H_2O \rightarrow CO_2 + H_2$. The water arising during the partial combustion in the combustion chamber is used for this conversion reaction. If the water content at the beginning of the conversion is not sufficient, steam or a water spray is added. The temperature in the combustion chamber is about 1,200° C. Catalysts as usually used, however, operate best in a temperature region of about 400° C. The factor of hydrogen gas, defined as:

$$Kw = \frac{\%CO \times \%H_2O}{\%H_2 \times \%CO_2}$$

is about .08% at the temperature of 400° C., whereas at the combustion chamber temperature of 1,200° C. it is approximately 2.5%. In order to increase the absolute content of the hydrogen and to decrease the carbon monoxide content, it is necessary to cool the gas as it comes from the combustion chamber, before it is led over the catalysts.

Conversion itself is an exothermal process. In order to prevent an undesirable temperature rise during the reaction, the catalyst itself has to be cooled, or the reaction must be divided into various steps, each one requiring an intermediate cooling, in order to be able to dissipate the reaction heat.

Gas generators operating according to the process described usually consist of a combustion chamber and a reaction chamber or converter to which the gas from the combustion chamber is led. In the path of the gas from combustion chamber to the converter, a heat exchanger is arranged in order to cool the gas before it is admitted to the catalysts within the converter. The temperature of the gas mixture within the reaction chamber containing the catalysts is controlled during the conversion process. A suitable quantity of steam or water is supplied to this path of the gas in accordance with this control. Additional apparatus to remove organic sulfur compounds, and to dry the gas, may also be combined in such an apparatus. All these units form separate assemblies, in each of which the separate process steps are carried out. They are connected by suitable ducts or conduits or pipes. Each one of the units may be of a construction customary in the chemical conversion art.

It is an object of the present invention to provide an apparatus for the production of reducing gas which is compact, suitable for the production of small quantities of gas, and forms a unitary assembly.

It has been found that gas generator systems, in which the combustion chamber, heat exchanger and converters, are formed as separate units connected by tubes or pipes, are difficult to control when only smaller quantities of gas are to be generated. For example, if gas in the order of 100 m³/hr. is to be generated, control of heat and of the temperature of the units connected by tubing or pipes is very difficult. Furthermore, such systems require a long start-up time, which may be up to a day or longer, until stable, equilibrium operating conditions are obtained. The temperature regulating and control arrangements on such systems at the input point to the converter are furthermore complicated and thus expensive, and may not be economical for the production of small quantities of reducing gas.

Briefly, in accordance with the present invention, a reducing gas generator apparatus comprises a unitary assembly of a combustion chamber, a heat exchanger and a catalytic gas converter. The three units themselves are arranged within a common insulating jacket, and the heat exchanger and catalytic gas converter are arranged immediately above the combustion chamber, with sufficient space therebetween to provide for cooling. The catalytic gas converter and the heat exchanger are telescopically arranged in such a manner that the converter is located within the heat exchanger itself, and in a region where the gas supplied thereto has already been cooled by the heat exchanger. Thus, a compact unit is provided. In addition, the telescopic arrangement permits easy removal of the catalytic elements for regeneration or maintenance purposes. The heat exchanger is preferably a recuperator formed by a jacketed vertical cylinder with a narrow space between the walls of the jacket. The gases from the combustion chamber are on the inside, and a cooling fluid, for example air, is circulated within the jacket, in the same direction as the flow of gas within the heat exchanger.

The unitary assembly of the elements necessary in order to carry out the separate process steps, combustion, cooling and catalytic conversion, provides for a gas generator which requires little space and also only a short start-up time. Also, the safety of the entire apparatus is increased because there are no pipe connections which might leak the poisonous carbon monoxide. The entire unitary assembly is readily insulated against heat loss and sealed against escape of gas or fuels.

The heat exchanger is never exposed to very high temperature and thus does not require expensive high temperature alloy material. The heat exchange medium, usually air, is introduced into the space between the walls of the heat exchanger at substantial speed. Thus, the surfaces of the recuperator or heat exchanger remain comparatively cool. Since the gas escapes from the combustion chamber with substantially low velocity, the portion of heat exchange due to convection is small. The gas, after having been cooled, is also introduced into a narrow space adjacent the inner heat exchanger wall, in order to increase the cooling thereof. This is achieved in accordance with a feature of the invention, by assembling the catalytic material within a housing which is located within the jacketed cylindrical portion and spaced therefrom by only a narrow slot, of about the same width as the space between walls of the jacket and the cylinder. The housing is open at the top and the gases from the top can enter into the housing, along the wall thereof, and along the walls of the containers for the catalytic material. The gases now flowing downwardly, now enter the containers for the catalytic material where their direction is again changed upwardly. They are removed by an exit manifold. As the gases pass the catalytic material, the gas itself is capable of absorbing the heat of reaction. Measurements have shown that by this counterflow arrangement of the gas within the catalytic converter, excellent and uniform temperature distribution along the length of the catalytic material can be obtained.

The apparatus of the present invention can also be used to obtain heated air which can otherwise be utilized in the plant. An example of such use would be the regeneration of adsorption material, which may be used to remove undesirable components from the gas obtained from the apparatus, for example carbon dioxide ($CO_2$). To heat the air it is led in the same direction as the escaping gas, that is upwardly, within the jacket of the heat exchanger. Thus, the fresh, coolest air, is introduced at the point where the gases are hottest, thereby protecting the equipment. If the air does not reach the required temperature for regeneration of adsorption material, additional heat may be supplied to the air. Such additional heating is preferably controlled from a temperature sensing gauge located at the exit manifold of the heat exchanger. Since, upon heat exchange in the same direction of flow, the temperatures of the respective materials approach each other asymptotically, it is comparatively simple to provide a control for the heat exchanger such that the gases entering the converter have the right temperature value. Additionally, operating equilibrium can be achieved rapidly.

The apparatus of the present invention is particularly useful for use with exothermal reactions, and will be described in detail in connection with such a reaction. It is, however, also possible to use the same apparatus with endothermal reactions. In such case, indirect heating of the combustion chamber can be further provided, in order to furnish the additional heat, as is well known. The apparatus of the present invention is useful not only for the production of reducing, or protective gases, but also for the production of other gases in which similar process steps are involved.

The structure, organization and operation of the invention will now be described more specifically in the following detailed description with reference to the accompanying drawings, in which:

FIG. 4 is a simplified view of FIG. 1, in combination with additional units for pheheating and utilization of cooling or preheat, respectively, air.

Figure 1:
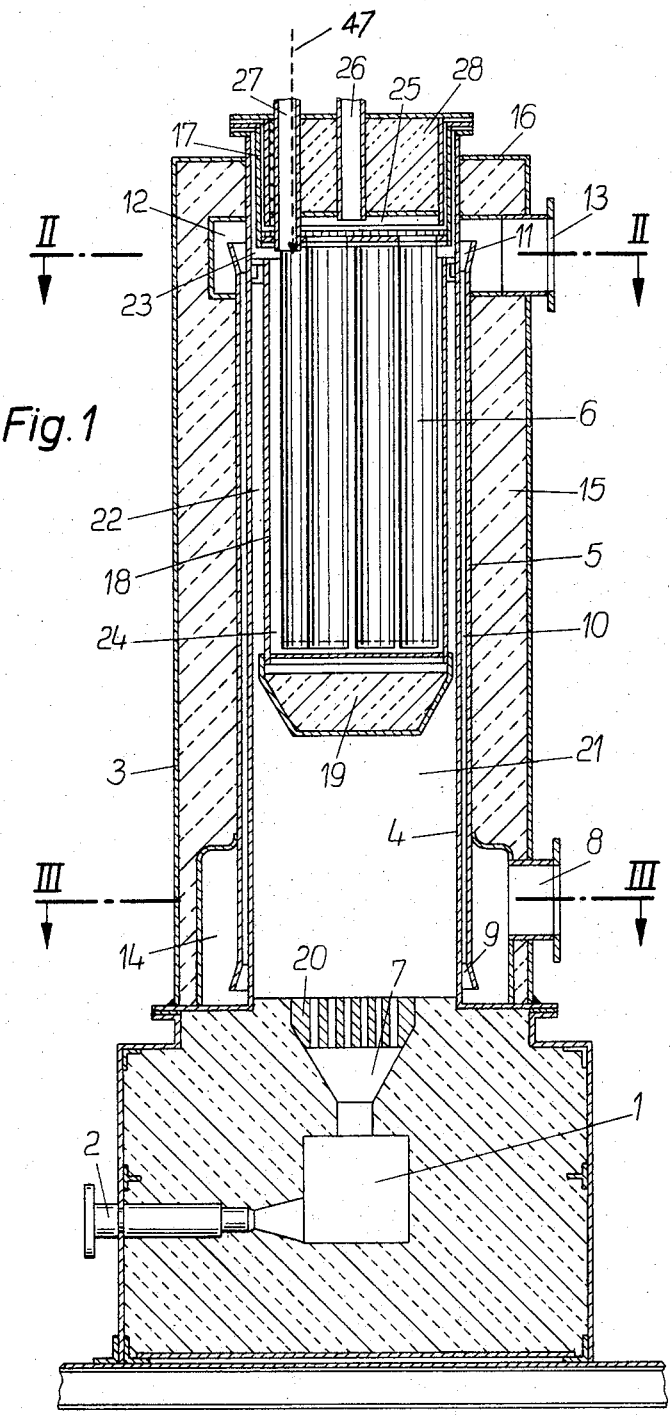
FIG. 1 is a vertical axial sectional view of the apparatus according to the present invention.
Figure 2:
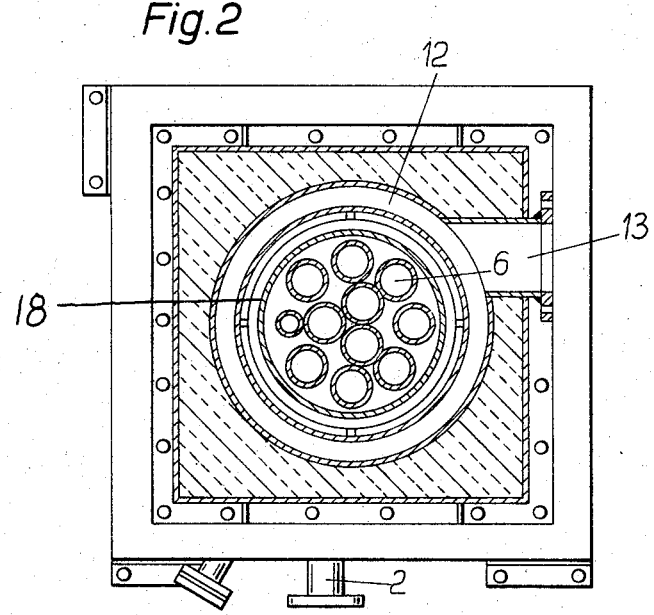
FIGS. 2 and 3 are sectional views along lines II—II and III—III of FIG. 1.
Figure 3:
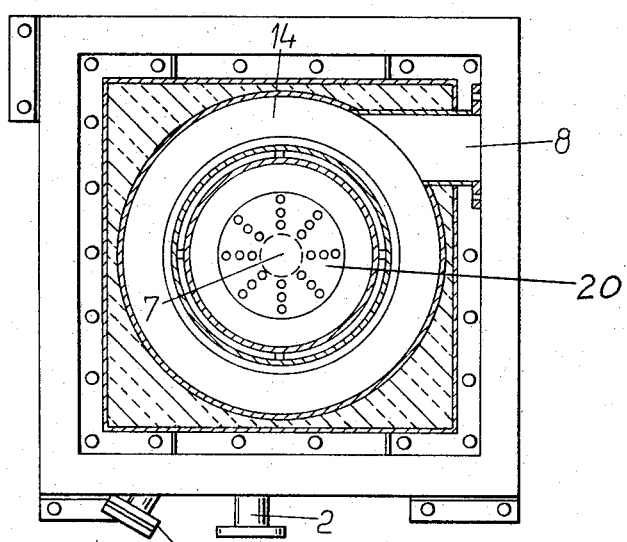

Referring now to the drawings: FIG. 1 illustrates a combustion chamber 1, enclosed within an insulated housing, for example of brick. A burner and burner supply, schematically illustrated at 2, has the starting material for gas generation applied thereto. A converter 3 is mounted above the combustion chamber and secured thereto, for example by welded flanges. Converter 3 consists essentially of a cylindrical converter chamber 4, the outside wall of which is surrounded by a narrow space forming a heat exchanger 5. Within the converter chamber 4, tubular containers 6 for catalytic reaction material are arranged.

Gas which is burned in combustion chamber 1, escaping through the upper region 7 and through a perforated cover plate 20, which may be formed of stone or refractory material, enters the lower portion of converter chamber 4. The heat exchanger for the converter chamber is formed as a cylindrical, narrow gap recuperator. The heat removing medium, usually air, is conducted to the heat exchanger at an intake manifold 8, entering at region 9 within an outer gap 10 between the cylindrical wall of converter 4, and the outer jacket of the heat exchanger 5. The air passes along the side of the entire length of the converter chamber, and then exits at region 11 into an exit manifold 12, from where it is led off by means of conduit flange 13. A similar intake manifold is at the bottom of the chamber, illustrated at 14, and in communication with intake connection 8. The entire outer surface of the heat exchanger 5 is covered by a heat insulating material 15, which may also be brick.

Containers 6 for the catalytic materials are secured to a hanger 17 fitting through top portion 16 of the converter and telescopically within the converter chamber 4. They are surrounded by a housing 18, closed at the bottom by means of a heat shield 19 and open at the top. The heat shield is in the form of a truncated cone, see FIG. 1, in order to avoid turbulence at the edges of housing 18 and hot spots. The heat shield 19 also prevents excessive transmission of heat from combustion chamber 1 to the bottom portions of the catalytic material within tube 6. The perforated refractory cover 20 for the combustion chamber further contributes to even distribution within chamber 4.

Gases from combustion chamber 1, after having passed through the perforated cover 20, are cooled from a temperature of about 1,500° C. to about 900° C. in the region below heat shield 19. They then enter into the narrow gap between housing 18 and the wall of converter chamber 4, which gap is in the same order of magnitude as the gap between the outer jacket of heat exchanger 5 and the wall of converter chamber 4. As the gases rise along the wall of converter chamber 4, they transmit heat further to the air within heat exchanger 5, so that when they reach the upper portion of the gap, for example as at 22, they will have obtained a temperature of about 350° C. Gases now enter at region 23 into the interior of housing 18 which is open at the top and pass downwardly along the walls of containers 6. Thus, they absorb part of the conversion heat from containers 6, and will reach a temperature of about 400° C. when they have reached region 24, at the lower open ends of containers 6. After again changing direction, the gases enter within containers 6 where they stream upwardly and where the conversion reaction takes place. The converted gases, which will also have a temperature of about 400° C. collect in region 25 from where they can be taken off by means of a pipe 26. Pipe 27 is provided to remove gas which has not yet been converted. Ordinarily, pipe 27 will be capped (not shown). Water or steam may be introduced into the gas also at region 23. To this end a water or steam line shown dotted at 47 may be run concentrically with line 27, terminating in a nozzle not shown and well known in the art.

As shown particularly in FIG. 1, the entire assembly which includes the conversion containers 6 is closed by a cover 28, likewise insulated, and telescopically hung into the conversion chamber 4. It is thus easily possible to remove the entire unit by pulling it out upwardly, without disassembling the conversion chamber itself. Thus, cleaning, maintenance or replacement of the catalytic material within containers 6 can readily be accomplished. The units themselves are preferably bolted together (not shown) or clamped, or otherwise secured in a removable manner.

By suitable dimensioning of the gap between chamber 4 and the recuperator-heat exchanger 5, and between housing 18 and the wall of conversion chamber 4, the temperature level of the containers 6 can be maintained substantially constant throughout their entire length, without additional regulating or control arrangements. Thus, the efficiency of conversion is high. The present assembly is particularly useful to generate protective gas, for example for use in annealing furnaces; the air heated in the recuperator 5 can be used in order to heat an adsorption chamber provided to remove carbon dioxide.

Referring now particularly to FIG. 4, where like parts are indicated by like reference numerals, the gap type recuperator 5 has a further heat exchanger 30 connected to the input thereto. Blower 31 supplies air to heat exchanger 30, which is in turn supplied to input 8 of the gap type recuperator. Heat exchanger 30 further cools the gas obtained from conduit 26 from the gas generator, which causes only a slight rise in temperature of the air supplied to input 8. It may be necessary to add additional heat, if the air taken from the heat exchanger 13, at exit tube 35, is to be used for an adsorption process, schematically illustrated at 36. Gases from the gas generator 26, after having been cooled in preheater 30, are led to the adsorption chamber 36, as shown in dashed lines, and taken out of the adsorption chamber through conduit 38. Heated air from the recuperator 35 is supplied to the adsorption chamber for regeneration as desired. Additional heating if necessary, is supplied by supplementary heater 32, shown schematically in combination with the heat exchanger 30. Operation of the supplementary heat supply 32 can be controlled by a temperature gauge 33.

If the temperature of the air to be taken out from pipe 13 and conduit 35 is to be low, a bypass line, indicated by dashed line 34, may be provided, which introduces additional cold air from heat exchanger 30 to the heated air in conduit 35. Again, a gauge similar to gauge 33 may be utilized to control valve settings on line 34.

An apparatus, constructed in accordance with the present invention, had the following operating temperatures: A combustion temperature of 1,200 to 1,600° C. was provided within chamber 1. In spite of the variation of combustion chamber temperature, the lower portion of the gap type recuperator never rose to a temperature higher than 500° C. By appropriate regulation of auxiliary heater 32, entrance temperature of the air at tube 8, and in entrance manifold 14, was regulated to be about 300° C. The quantity of air introduced through 8 was about ten times the quantity of gas to be converted. With such operation, temperatures at the entrance and exit of the converter were substantially independent of the amount of the gas to be converted, and were approximately 400° C. with a tolerance of less than ±10° C. Very low start-up time was achieved; less than two hours were required from completely cold operation to achieve operating equilibrium. Very little additional heat from source 32 was necessary, since the gas from line 26, through heat exchanger 30 itself, preheated a substantial portion of the air within the heat exchanger and supplied by blower 31.

If the temperature of combustion in chamber 1 rises to high levels, it may be advantageous to introduce steam or water within the combustion chamber, rather than in region 23 (FIG. 1) of the converter. If, however, the combustion chamber temperature is comparatively low, then introduction of water or steam at region 23 is preferred. The introduction of water or steam into combustion chamber 1 can be done in a conventional manner, e.g. through tube 48.

The present invention thus provides a gas generator apparatus, formed as a unitary assembly of combustion chamber, heat exchanger and catalytic gas converter, and arranged in such a manner that the temperature of combustion gases is sufficiently lowered for proper operation of the catalytic converter, and further provides for removal of heat during exothermal conversion processes.

The invention has been illustrated and described as embodied in a reducing gas or protective gas generator; it is not intended to be limited to the details shown. Various modifications and structural changes may be made, as determined by the requirements of particular applications or uses, without departing from the inventive concept.

I claim:

1. Reducing gas generator apparatus, comprising a unitary assembly of a combustion chamber, a heat exchanger and a catalytic gas converter, said heat exchanger and catalytic gas converter being telescopically arranged within each other; the improvement wherein said catalytic converter is located immediately above said combustion chamber 1, 4; and the catalytic converter comprises a support 17 secured to the top 16 of said assembly, open tubes 6 secured to said support 17 and adapted to be charged with catalytic material and depending from said support 17 and a converter chamber housing 18 surrounding said tubes 6 and closed at the bottom 19, said housing 18 and said tubes 6 directing reducing gas from said combustion chamber along said housing and through the tubes in counterflow relationship.

2. Apparatus as claimed in claim 1, wherein the heat exchanger is formed by a jacketed vertical cylinder with a narrow outer gap between said jacket and said cylinder, and means are provided to admit cooling fluid to said gap at the bottom thereof, so that the cooling fluid will be admitted to the space formed by said outer gap at the region where the gas is hottest.

3. Apparatus as claimed in claim 1, the outer walls of said assembly being heat insulated.

4. Apparatus as claimed in claim 1, wherein the heat exchanger is formed by a jacketed vertical cylinder, the converter is arranged at the upper part of said cylinder, and the converter chamber housing is open at the top to gas flow upwardly through said vertical cylinder and along said housing, then downwardly through said housing, and again upwardly through said tubes adapted to be charged with catalytic material.

5. Apparatus as claimed in claim 1, the bottom part of said converter housing having a heat shield.

6. Apparatus as claimed in claim 5, said heat shield being formed in the shape of a truncated cone to decrease turbulence of generated gases streaming upwardly from said combustion chamber past said housing.

7. Apparatus as claimed in claim 1, wherein said support and said tube secured thereto are telescopically arranged within said converter chamber housing and independently removable therefrom.

8. Apparatus as claimed in claim 2, said assembly being formed with annular heat exchange fluid manifolds, arranged at the top and bottom of said assembly and having connections with said outer gap.

9. Apparatus as claimed in claim 4, the converter chamber housing being spaced from the inner wall of said vertical cylinder by a narrow gap.

10. Arrangement as claimed in claim 1, including water inlet means located at the top of said assembly and having an outlet adjacent the top of said open tubes adapted to be charged with catalyst material.

11. Apparatus as claimed in claim 2 including an additional heat exchanger, means introducing cooling gas into said additional heat exchanger; duct means connected to said additional heat exchanger and to said cooling fluid admission means taking said cooling gas from said heat exchanger and to said cooling fluid admission means; and duct means in communication with said catalytic gas converter conducting gas generated in said generator apparatus to said additional heat exchanger, to affect preheating of said cooling gas in said additional heat exchanger with heat taken from gas generated in said apparatus.

12. Apparatus as claimed in claim 11, and preheat means in said additional heat exchanger for additionally preheating said cooling gas; a temperature gauge arranged at the outlet of said gas generator apparatus to measure the temperature of the gas obtained therefrom and means to control the supply of heat by said additional heat exchanger means in dependence on the temperature sensed by said gauge.

13. Apparatus as claimed in claim 2 including an adsorption chamber, means interconnecting the catalytic gas converter and the absorption chamber to guide gas from said gas generator apparatus to said adsorption chamber; and duct means interconnecting said heat exchanger and said absorption chamber to guide cooling gas heated in said heat exchanger to said adsorption chamber for heating said chamber to desorption temperature.

References Cited

UNITED STATES PATENTS 2,644,744   7/1953   Hartwig et al. _____ 48—196

JAMES H. TAYMAN, JR., *Primary Examiner.*